United States Patent [19]

Proebstle et al.

[11] Patent Number: 4,997,596

[45] Date of Patent: Mar. 5, 1991

[54] FISSIONABLE NUCLEAR FUEL COMPOSITION

[75] Inventors: Richard A. Proebstle, San Jose; Mickey O. Marlowe, Fremont; Anthony P. Reese, San Jose, all of Calif.

[73] Assignee: General Electric Company, San Jose, Calif.

[21] Appl. No.: 408,852

[22] Filed: Sep. 18, 1989

[51] Int. Cl.⁵ .............................................. C09K 11/04
[52] U.S. Cl. .................................... 252/638; 252/625; 252/640; 252/643; 264/0.5; 376/419; 376/901; 376/903
[58] Field of Search ...................... 376/901, 903, 419; 264/0.5; 252/638, 643, 640, 625

[56] References Cited

U.S. PATENT DOCUMENTS

| | | | |
|---|---|---|---|
| 2,951,801 | 9/1960 | Lillie | 204/193.2 |
| 2,967,812 | 1/1961 | Thurber | 204/193.2 |
| 3,009,869 | 11/1961 | Bassett | 204/193.2 |
| 3,103,467 | 9/1963 | Mumm | 204/193.2 |
| 3,122,484 | 2/1964 | Iskenderian | 176/18 |
| 3,263,004 | 7/1966 | Bean | 264/0.5 |
| 3,372,213 | 3/1968 | Nishiyama et al. | 264/0.5 |
| 3,501,411 | 3/1970 | Triggiani et al. | 252/301.1 |
| 3,625,821 | 12/1971 | Ricks | 176/68 |
| 3,917,768 | 11/1975 | Abate-Daga et al. | 264/0.5 |
| 4,007,049 | 2/1977 | Rossi et al. | 106/58 |
| 4,774,051 | 9/1988 | Peehs et al. | 376/419 |
| 4,818,477 | 4/1989 | Chubb | 376/419 |

FOREIGN PATENT DOCUMENTS 0147182  3/1985  European Pat. Off. .

Primary Examiner—Stephen J. Lechert, Jr.
Assistant Examiner—Nina Bhat
Attorney, Agent, or Firm—Robert R. Schroeder

[57] ABSTRACT

The disclosed invention consists of a ceramic form of fuel for a nuclear reactor comprising an oxide of a fissionable element and containing therein a consumable neutron absorbing agent. The ceramic fissionable fuel product provides longer fuel performance in nuclear reactor service.

10 Claims, 1 Drawing Sheet

FISSIONABLE NUCLEAR FUEL COMPOSITION

FIELD OF THE INVENTION

This invention relates to an improvement in fissionable nuclear fuel containing a depletable neutron absorbent material for service in the fuel core of power generating nuclear reactor plants. The invention comprises a composition for a ceramic fuel of a fissionable oxide compound having a fuel reactivity extending neutron absorbent dispersed therethrough.

BACKGROUND OF THE INVENTION

Fissionable nuclear fuel materials for the nuclear reactors comprise one of two principal chemical forms. One distinct type consists of fissionable elements such as uranium, plutonium or thorium, and mixtures thereof, in metallic, non-oxide form. Specifically this category comprises uranium, plutonium or thorium metal, and mixtures or alloys of such metals.

The other principal type of nuclear reactor fuel consists of ceramic or non-metallic oxides of fissionable and/or fertile elements comprising oxides of uranium, plutonium or thorium, and mixtures of such oxides. Uranium oxides, especially uranium dioxide, has become a standard form of fissionable fuel for commercial nuclear power plants used to generate electrical power. However, minor amounts of other fissionable materials, such as oxides of plutonium and thorium, and/or depletable neutron absorbers, sometimes referred to in the art as "burnable poison", such as gadolinium oxides, are commonly included in the fuel with the uranium dioxide.

In conventional nuclear reactors, atoms of the fissionable material comprising uranium and plutonium isotopes absorb neutrons into their nuclei and undergo a nuclear disintegrating or splitting. This fission reaction produces on the average of two products of lower atomic weight and greater kinetic energy, and typically two or three neutrons, also of high energy.

The fission produced neutrons diffuse through the reactor core containing fissionable fuel and are either utilized or lost in several distinct competing mechanisms. Some neutrons undergo nonfission or radiative capture in the fuel material. Other neutrons undergo fission capture within the fissionable fuel and thereby produce additional fission neutrons, the so-called chain reaction. Namely, fast neutrons are captured in the uranium 235 and 238, while thermal neutrons are captured in uranium 235. Still other neutrons undergo parasitic capture in the various extraneous or nonfissionable compositions of the fuel core and adjoining components such as the moderator, coolant, various structural materials, fission products produced within the fuel, as well as any neutron absorbing reaction control materials applied to regulate the fission rate.

The balance between the fission production of neutrons and the various competing mechanisms for neutron consumption determine whether the fission reaction is self-sustaining, decreasing, or increasing. When the fission reaction is self-sustaining, the neutron multiplication factor equals 1.0, the neutron population remains constant, and on average there is one neutron remaining from each fission event which induces a subsequent fission of an atom.

Heat produced by the fission reactions is thereby continuous and maintained as long as sufficient fissionable material is present in the fuel core to override the effects of fission products formed by the reaction, some of which have a high capacity for absorbing neutrons. The heat produced by the fission reactions is removed by a coolant such as water, circulating through the reactor core in contract with the containers of fuel and conveyed on to means for its utilization, such as the generation of electrical power.

The neutron population, and in turn the heat or power produced, of a nuclear reactor, depends on the extent to which neutrons are consumed or wasted by capture in nonfissionable, neutron absorbing material. Neutron consumption of this nature is regulated by governing the relative amount and capacity of neutron absorbing control materials imposed into the core of fissionable fuel material undergoing fission reactions.

In any case, the fission reactivity of the fuel progressively decreases with time in service due in large part to fission-product accumulation within the fuel. This progressive depletion of fission reactively is typically compensated for by withdrawal of the neutron absorbing control rods whereby the neutron population available to perpetuate fission is regulated to maintain a continuing level of reactivity.

To achieve greater efficiency and economy in the operation of nuclear reactor plants efforts have been made to extend the service life of the fuel between refueling cycles. One common measure for prolonging fuel performances has been to utilize a fuel having excessive reactivity in combination with a depletable neutron absorbent, frequently referred to in the nuclear reactor art as a "burnable poison." Thus, the initial excessive reactivity of the fuel is tempered by the introduction of a depletable neutron absorbent, or "burnable poison", such as gadolinium oxide which progressively expends its capacity for neutron due to their absorption. Thus, prolonged fuel service is provided with the high reactivity fuel while the initial excessive reactivity of the fuel is negated by the removal of fission producing neutrons with a depletable neutron absorbent which serves to level or stabilize the fuel reactivity rate over its services life. The depletable absorber is utilized so as to absorb neutrons at a decreasing rate approximately commensurate with the diminishing reactivity of the fuel whereby a substantially constant rate of reactivity is maintained through the cycle.

The practice and means for this fuel performance extending measure are disclosed in detail in U.S. Letters Pat. No. 3,799,839, issued March 26, 1974. Depletable neutron absorbent agents and their relevant properties are also disclosed in an article entitled "Nuclear Theory And Calculations For Burnable Poison Design" by W. A. Northrop, pages 123–150, published in *Neutron Absorber Materials For Reactor Control*, Untied States Atomic Energy Commission.

The disclosure and contents of the foregoing cited background publication are incorporated herein by reference.

SUMMARY OF THE INVENTION

This invention comprises an improved fissionable nuclear fuel composition comprising a ceramic unit containing an oxide of a fissionable element having a given depletable neutron adsorbent dispersed therein for service in a nuclear reactor. The combination of the fissionable oxide material and specific depletable neutron absorbent agents of this invention in a ceramic fuel unit or pellet produces a fuel product which provides extended service in nuclear reactor plants at relatively uniform reactivity levels.

OBJECTS OF THE INVENTION

It is a primary object of this invention to provide an improved fissionable fuel composition for nuclear reactor service.

It is also an object of this invention to provide a fissionable nuclear fuel product for use in a nuclear reactor which serves over extended periods between refueling.

It is a further object of this invention to provide an improved ceramic type nuclear fuel comprising an oxide of a fissionable element containing a consumable neutron absorbent material for prolonged service life.

It is a still further object of this invention to provide a ceramic fissionable fuel pellet of an oxide of uranium combined with a depletable neutron absorbent supplying long service between refueling.

It is an additional object of this invention to provide a ceramic nuclear fuel product of a combination of uranium dioxide with a depletable neutron absorbent dispersed throughout the uranium dioxide. cl BRIEF DESCRIPTION OF THE DRAWING The drawing comprises a perspective view of a fissionable nuclear fuel pellet of this invention.

DETAILED DESCRIPTION OF THE INVENTION

Figure 1:
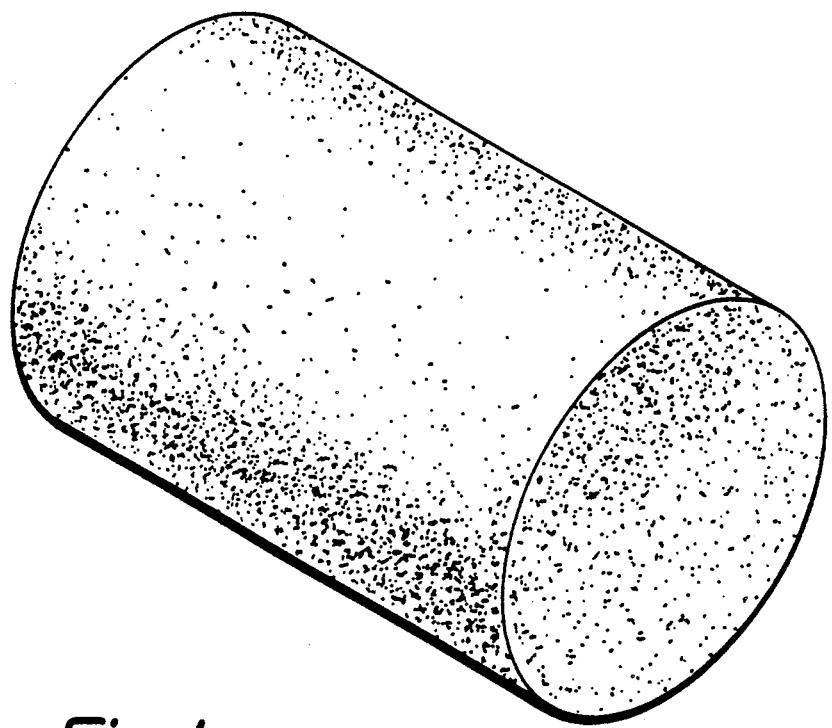

This invention comprises an improvement in ceramic type fissionable fuels for service in power generating nuclear reactor plants utilizing water as the coolant and neutron moderator. The ceramic fuel materials comprise oxides of uranium, plutonium or thorium, and mixtures thereof. The preferred and typical fissionable material for the practice of the invention consists of uranium dioxide, which can incorporate minor amounts of oxides of plutonium and/or thorium, and other conventional additives.

The ceramic fuel is produced by compacting particulate uranium oxides, admixed with any additives in fine particulate or powder form, into self-sustaining or handleable pellets or bodies of suitable configuration and density, then sintering the particulate compacts to fuse the particles into integrated ceramic units.

In accordance with this invention boron nitride (BN) and/or zirconium diboride ($ZrB_2$) and/or boron oxide ($B_2O_3$) and/or boron silicide ($B_6Si$) is incorporated into the ceramic fuel of an oxide of uranium, plutonium and/or thorium to provide an improved fissionable fuel composition for extended service in a nuclear reactor plant. The boron nitride and/or zirconium diboride and/or boron oxide and/or bon silicide is dispensed as a powder or fine particles throughout the mass of the ceramic pellet of fused oxides of a fissionable element(s).

The boron nitride, boron oxide, boron silicide and/or zirconium diboride in powder form can be dispersed substantially uniformly throughout the loose particulate oxide fuel of uranium, plutonium and or thorium prior to compacting. The combined composite fuel composition particles are then compacted and subsequently sintered in a conventional manner as described in the art. The depletable neutron absorbent boron compound containing ceramic fissionable fuel composition of this invention compressed into a pellet and sintered into an integrated body is shown in the drawing.

The boron compound depletable neutron absorbent is combined with the oxide fuel material in amounts of from about 0.02 up to about 0.50 percent by weight of the fissionable oxide fuel material. Preferably the boron compound is added in amounts of from about 0.04 up to about 0.35 percent by weight of the fissionable oxides fuel material. Optimum amounts of boron nitride comprise about 0.13, zirconium diboride comprise about 0.31, boron oxide comprises about 0.19, and boron silicide about 0.09 percent by weight of the fissionable oxide fuel material.

Examples of fissionable fuel compositions of this invention, and their preparation, are as follows:

EXAMPLE 1

Uranium dioxide powder was mixed with 0.30 weight percent powdered zirconium diboride. The mixed powders were pressed in a cylindrical steel die to form pellets with a density of about 5.8 gm/cm$^3$. The pressed pellets were sintered about 4 hours at about 1700 degrees C. in a moist hydrogen atmosphere. The resulting pellets had a density of about 10.4 gm/cm$^3$.

Ceramography of the sintered fuel pellets revealed a uniform distribution of zirconium diboride as inclusions in the uranium dioxide pellet matrix.

EXAMPLE 2

Use of powder additives of the type described herein to provide a burnable neutron absorber in the final sintered fuel pellet allows a large range of concentration variation, and, by control of the amount of boron containing compound added to the fuel pellets at various axial elevations in the fuel rod and spatially, from rod to rod within the fuel assemblage comprised of a plurality of fuel rods.

What is claimed is:

1. A fissionable nuclear fuel composition for service in a nuclear reactor fuel core consisting essentially of a ceramic body of fissionable oxide fuel material selected from the group consisting of uranium oxides, plutonium oxide and thorium oxides, and mixtures thereof, and containing dispersed throughout the ceramic body of fissionable oxide fuel material at least one boron depletable neutron absorbent selected from the group consisting boron nitride, boron oxide and boron silicide in amounts of from about 0.02 up to about 0.50 percent by weight of the fissionable oxide fuel material.

2. The fissionable nuclear fuel composition for service in a nuclear reactor fuel core of claim 1, wherein the boron depletable neutron absorbent is dispersed throughout the ceramic body of fissionable oxide fuel material in amounts of from about 0.04 up to about 0.35 percent by weight of the fissionable oxide fuel material.

3. The fissionable nuclear fuel composition for service in a nuclear reactor fuel core of claim 1, wherein the ceramic body of fissionable oxide fuel material consists essentially of uranium dioxide.

4. A pellet of a fissionable nuclear fuel composition for service in a nuclear reactor fuel consisting essentially of a ceramic pellet of fissionable oxides fuel material selected from the group consisting of uranium oxides, plutonium oxides and thorium oxide, and mixtures thereof, and containing dispersed throughout the ceramic pellet of fissionable oxide fuel material at least one boron depletable neutron absorbent selected from the group consisting of boron nitride, boron oxide and boron silicide in amounts of from about 0.02 up to about 0.50 percent by weight of the fissionable oxides fuel material.

5. A pellet of a fissionable nuclear fuel composition for service in a nuclear reactor fuel core of claim 4, wherein the boron depletable neutron absorbent is dispersed throughout the ceramic pellet of fissionable oxide fuel material in amounts of from about 0.04 up to about 0.35 percent by weight of the fissionable oxides fuel material.

6. The pellet of a fissionable nuclear fuel composition for service in a nuclear reactor fuel core of claim 4, wherein the ceramic pellet of fissionable oxide fuel material consists essentially of uranium dioxide.

7. The pellet of a fissionable nuclear fuel composition for service in a nuclear reactor fuel core of claim 4, wherein the boron depletable neutron absorbent dispersed throughout the ceramic pellet of fissionable oxide fuel material is boron nitride in amount of about 0.13 percent by weight of the fissionable oxide fuel material.

8. The pellet of fissionable nuclear fuel composition for service in a nuclear reactor fuel core of claim 4, wherein the boron depletable neutron absorbent dispersed throughout the ceramic pellet of fissionable oxide fuel material is boron oxide in amount of about 0.19 percent by weight of the fissionable oxide fuel material.

9. The pellet of a fissionable nuclear fuel composition for service in a nuclear reactor fuel core of claim 4, wherein the boron depletable neutron absorbent dispersed throughout the ceramic pellet of fissionable oxide fuel material is boron silicide in amount of about 0.09 percent by weight of the fissionable oxide fuel material.

10. A pellet of fissionable nuclear fuel composition for service in a water cooled and moderated nuclear reactor fuel core consisting essentially of a ceramic pellet of fissionable oxide fuel material consisting essentially of uranium dioxide and containing dispersed throughout the ceramic pellet of uranium dioxide fissionable fuel material at least one boron depletable neutron absorbent power selected from the group consisting essentially of boron nitride, boron oxide and boron silicide in amounts of from about 0.04 up to about 0.35 percent by weight of the fissionable oxide fuel material.

* * * * *